Nov. 10, 1925.
C. C. SPREEN
1,561,367
VALVE
Filed Aug. 4, 1924
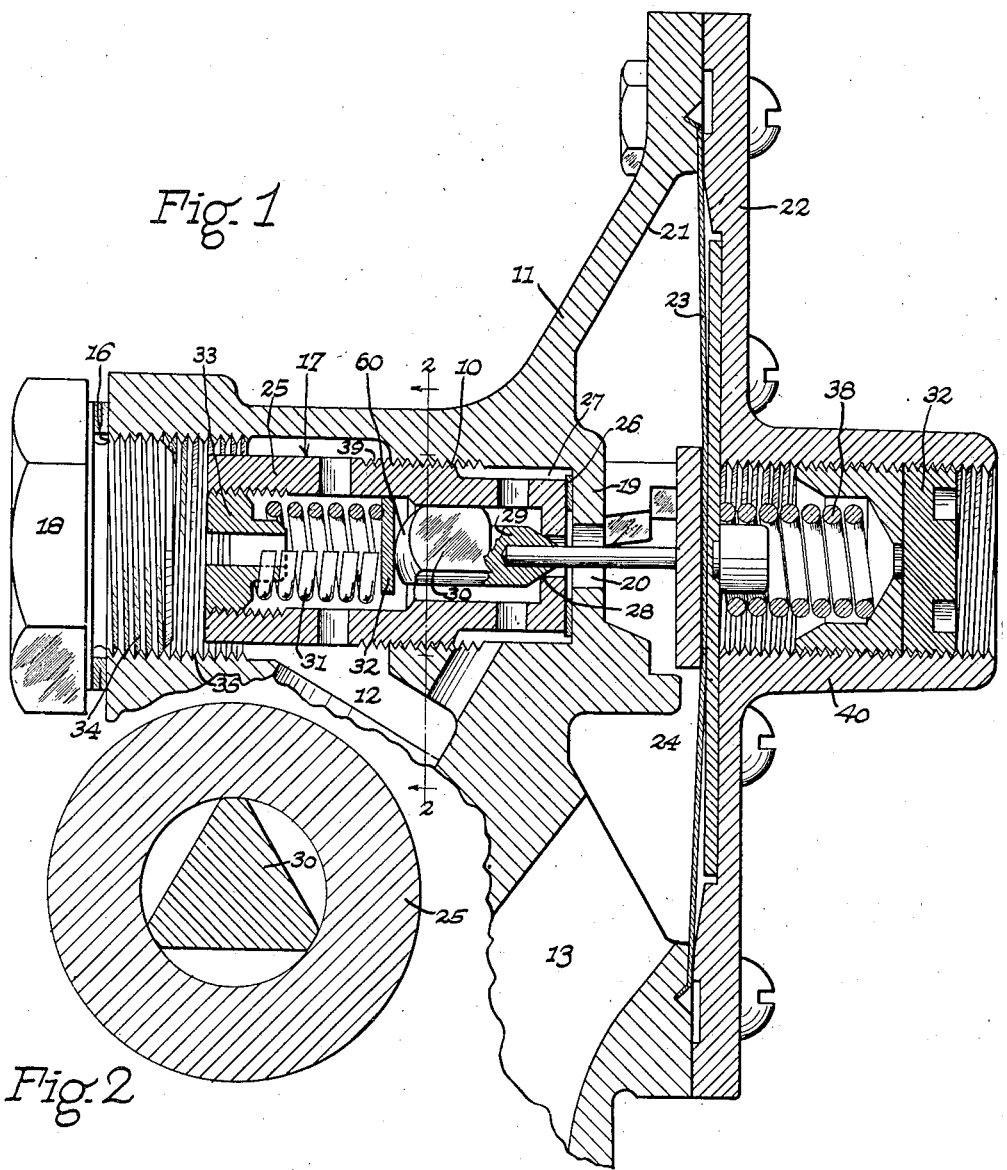
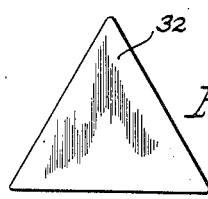
Charles C. Spreen
Inventor
by Smith and Freeman
Attorneys Patented Nov. 10, 1925.

1,561,367

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, A CORPORATION OF MICHIGAN.

VALVE.

Application filed August 4, 1924. Serial No. 729,940.

*To all whom it may concern:*

Be it known that I, CHARLES C. SPREEN, a citizen of the United States of America, and a resident of Detroit, in the county of Wayne and State of Michigan, have invented certain new and useful Improvements in Valves, of which the following is a full, clear, and exact description.

Inasmuch as refrigerating units for household use are normally operated over long periods without skilled attention it is necessary to construct these units so that failure is practically impossible. Heretofore an appreciable part of the relatively few failures has occurred in the expansion valve which customarily forms a part of each such refrigerating unit. Upon analysis, it appears that failure of the expansion valve is usually due to sticking and that this sticking is probably caused by binding of the valve in the supporting guide-way due to lateral thrust of the valve operating spring. My invention provides means whereby this difficulty is overcome.

In the drawings accompanying this specification and forming a part thereof I have shown, for purposes of illustration, one form which my invention may assume. In these drawings:

Figure 1 is a vertical section through the expansion valve embodying this illustrative form of my invention, Figure 2 is a section on the line 2—2 of Figure 1, while Figure 3 is an elevation of the intermediate member.

The form of my invention herein shown comprises a casing 11 provided with an inlet 12 arranged to be connected to the condensing coil of the refrigerating system, an outlet 13 arranged to be connected to the expansion coil of the refrigerating system, an opening 16 for insertion of the valve unit 17 normally closed by a screw-threaded plug 18, an annular shoulder 19 arranged to cooperate with the valve unit 17 and forming a restricted passage 20, and an open face 21 adapted to be closed by means of a plate 22 arranged to support a suitable diaphragm 23 within the diaphragm chamber 24 defined by the face 21 and the plate 22.

The valve unit 17 herein shown comprises a housing 25 arranged to be held in position within the casing 11 by the engagement of screw threads 39 carried by the housing 25 with cooperating screw threads 10 carried by the casing 11 and, when so positioned, to tightly engage the annular shoulder 19 through a packing ring 26 and thus connect the aperture 20 in the casing 11 to an aperture 27 in a valve seat 28 formed integral with the housing 25. This valve unit 17 also includes a valve 29 arranged to seat in and close the opening 27 within the valve seat 28 and supported by means of a triangular member 30 integral with the valve 29 and reciprocably mounted within the housing 25.

This valve 29 is urged to seating position by a spring 31 compressed between a plate 32 which abuts the triangular portion 30 of the valve 29 and an annular plug 33 positioned within the housing 25 and maintained in position by engagement of its screw threads 34 with cooperating screw threads 35 carried by the housing 25. The transmission of lateral strain or movement between the spring 31 and the valve 29 is prevented by inter-positioning the plate 32 and by forming the inter-engaging surfaces of the plate 32 and the triangular portion 30 of the valve 29 in such manner that these surfaces engage at substantially a single point, this result being attained by cutting away one or both of the inter-engaging surfaces, for example, by rounding, as shown herein, the engaging surface 60 of the triangular portion 30 of the valve 29.

The valve 29 is reciprocated away from the valve seat 28 against the action of the spring 31 by means of the diaphragm 23 acting in response to the combined influence of the change in pressure within the diaphragm chamber 24 and the spring 38 mounted within a tubular extension 40 formed integral with the plate 22 and herein shown as closed by means of a solid plate 32 screw-threaded within the tubular extension 40.

It will be apparent from the above description that in the expansion valve herein shown the inter-positioning of the plate 32 and the formation of the inter-engaging surfaces of the plate 32 and the triangular portion 30 of the valve 29 effectively prevents the transmission of lateral strains and movements between the spring 31 and valve 29 and thus effectively removes what is at the present time the chief cause of failure in expansion valves of the type herein shown.

It will be apparent, of course, that the particular construction herein shown may be variously changed and modified without sacrificing the advantages of my invention or departing from the spirit thereof and that my invention is applicable to valves other than the type herein shown. It will therefore be understood that the disclosure herein is illustrative only and that my invention is not limited thereto.

I claim:

An expansion valve comprising: a casing provided with an interior wall separating the space interiorly of said casing into an inlet chamber and an outlet chamber and pierced by an aperture adapted to afford communication between said chambers, one of said chambers comprising an elongated tubular recess alined with said aperture; a valve unit comprising a frame carrying the entire unit, of substantially even cross section throughout, removably positioned within said recess with its forward end abutting said wall and overlying said aperture, and provided with a bore communicating with said aperture and terminating in a valve seat, a valve head reciprocably mounted in said frame and arranged to close said valve seat and removable through the rear end of said frame, an adjustable abutment mounted in the said rear end of said frame, and a spring tensioned between said valve head and said abutment with its tension adjustable by adjustment of the position of said abutment; and a plug closing the outer end of said recess removable to permit bodily removal of said unit.

In testimony whereof, I hereunto affix my signature.

CHARLES C. SPREEN.